Jan. 14, 1936.  E. A. FREDRICKSON  2,028,101
VACUUM BREAKER VALVE
Filed March 30, 1932
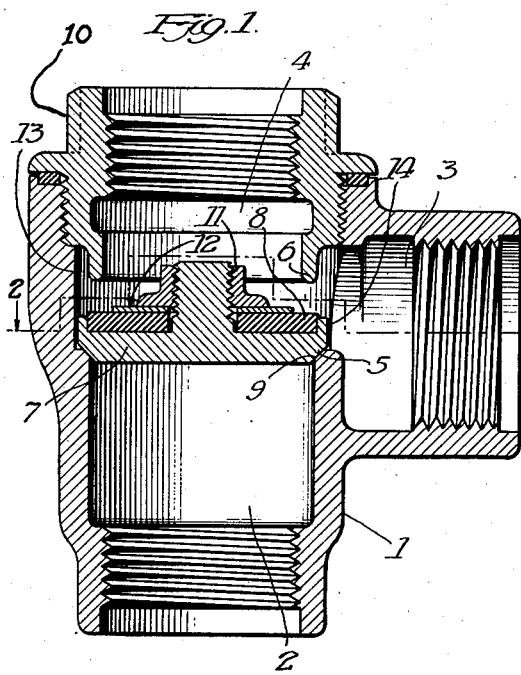
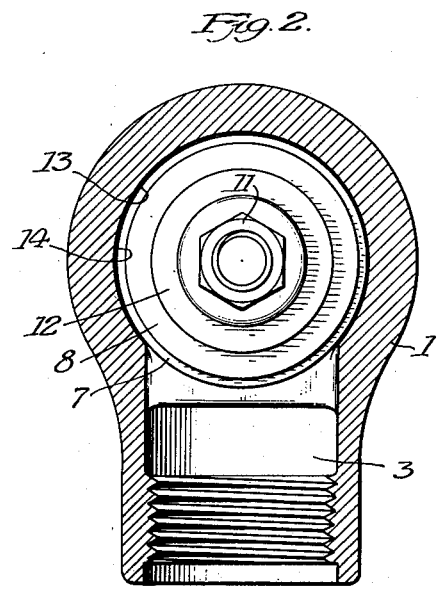
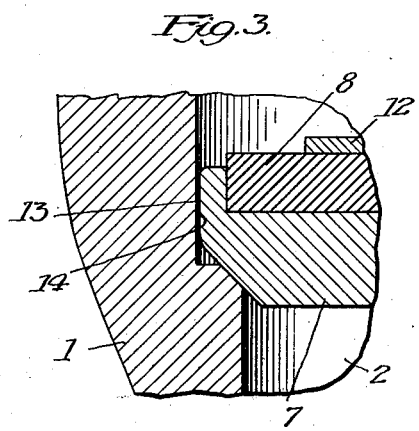
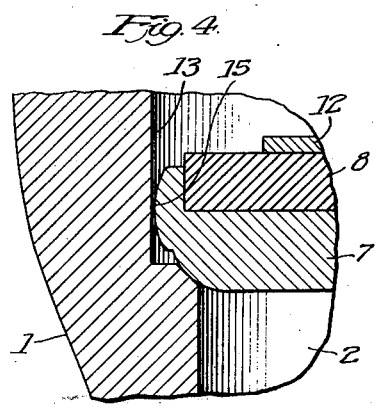
Witness:
R. B. Davison.
Inventor
Edward A. Fredrickson
By Joseph O. Lange
Atty.

Patented Jan. 14, 1936

2,028,101

UNITED STATES PATENT OFFICE 2,028,101

VACUUM BREAKER VALVE

Edward A. Fredrickson, Chicago, Ill., assignor to Crane Company, Chicago, Ill., a corporation of Illinois Application March 30, 1932, Serial No. 601,902

2 Claims. (Cl. 4—70)

This invention pertains to a device broadly classifiable as check valves and more particularly to that type known as a vacuum breaker valve.

By the latter name I refer to a valve adaptable for particular service in a water supply system, in which, if for any reason the water supply to a fixture should fail, it is possible and altogether probable that the water, for example, in the tub, bowl or other plumbing device might otherwise be syphoned out and flow back into the supply line were it not for the use of a valve embodying the principles of my invention. This back syphoning may be caused by a vacuum produced in the supply pipe line by shutting off the street main or the water supply in the building because of repairs or having a faucet or drain opened at a point below the fixture. In these instances a vacuum can be created in the supply line which could draw the water from the aforesaid fixture and produce a syphonic action inducing contamination of the supply line from any soiled matter in the fixture. The valve disclosed by this invention acts to prevent such a condition.

It is essential that with a valve for service of this type that the valve operate positively and be tight on extremely low pressures so as to prevent discharge of water on the floor through the vent connections either where the discharge of water is sluggish during normal operation or under conditions of greater deliveries and higher pressures.

By the particular construction hereinafter described a valve is obtained which is exceedingly sensitive to the slightest practical actuating pressure, and yet remains tight under all conditions.

The essential element behind my invention accounting for the alacrity to which the valve responds to the slightest pressure beneath the valve closure member is the fact that beneficial use is made of the highest back pressure, which can be built up beneath the valve closure member during its operation.

A more clear understanding of this invention will be had from the following drawing which illustrate one adaptation of the principle behind my invention.

In Fig. 1 a sectional assembly view of one form of the valve is shown.

In Fig. 2 a sectional view taken across the line 2—2 of Fig. 1 is shown.

In Fig. 3 is shown an enlarged sectional view of my construction as employed in Fig. 1.

In Fig. 4 is illustrated an enlarged sectional view of a modified construction which may also be used employing the principle of my invention.

Referring to Fig. 1, in a preferred embodiment of this invention, the valve consists of a body or casing 1, the latter having a normal inlet 2, side outlet 3, and a vent passage 4 leading to atmosphere by means of the vent bushing 10 and the vent cap 16, preferably attached to the bushing 10 by means of the threads 18. The vent cap is preferably furnished with a number of holes 17 for the purpose of admitting air into the casing from the surrounding atmosphere in the event of the creation of a vacuum within the line upon which the valve is installed.

When the latter condition occurs, the valve closure member 7, which is normally seated by line pressure against the contact surface 6, drops to the lower seating surface 9 of the casing, the air enters the vent passage 4 through the cap 16, and thence into the side outlet 3 to the fixture.

Immediately upon the water supply being again turned on, the closure member 7 almost instantaneously rises to make a pressure-tight bearing against the aforementioned seating surface 6, the normal path of flow being from the inlet 2 to the outlet 3.

The clearance between the bore 13 in the casing and the maximum peripheral diameter 14 of the valve closure member is preferably made relatively close throughout substantially the entire periphery, except as shown more clearly in Fig. 2, for that portion thereof leading into the outlet 3, which is obviously necessary as a means for discharge therethrough.

This general construction permits the valve closure member to build up back pressure sufficiently to render it extremely sensitive, even on very low pressures, as for example, one to two pounds pressure. This is a very important consideration contributing to the successful operation of the valve rendering it sensitive to the slightest pressure, for the reasons previously mentioned.

It will thus be apparent that when the line pressure acts against the under side of the valve closure member 7 and succeeds in lifting it from its seat, the only free egress which the fluid under pressure has lies through the side outlet.

The disc may be made as illustrated with a renewable composition insert 8 and held in place by the nut and washer 11 and 12 respectively, but, if desired, of course, it is possible to make the entire disc integral and thus dispense with the renewability of the upper seating member insert.

Fig. 4 shows a magnified view of the seat in which the valve closure member 7 having a curved periphery 15 engages closely with the casing bore 13, and is one of the numerous modifications available within the spirit of my invention.

It is, therefore, desired to be limited only within the scope of the appended claims.

I claim:

1. In a pressure actuated valve of the character described, a casing comprising respectively a fluid inlet, a fluid side outlet and a vent opening to atmosphere substantially coaxial with said inlet opening, a valve chamber within said casing positioned between the said inlet and the said vent, the said chamber having a side passageway to the said outlet, respective annular seats for the said inlet and the said vent within the said chamber, a plate type tiltable valve closure member normally seated by gravity at the lower portion of the said chamber and fitting closely therewithin for its entire maximum periphery except for that peripheral portion which is interrupted so as to form the said side passageway, the said closure member being freely movable axially within the said chamber and having respective seat bearing contacts upon its upper and lower surfaces, the lift of the said valve closure member being substantially less than the diameter of the said seats whereby the latter lift limitation allows for the tilting of the said closure member so that the said closure member upon its initial actuation by line pressure is capable of contacting simultaneously at both of its respective upper and lower seats.

2. In a pressure actuated valve of the character described, a casing comprising respectively a fluid inlet, a fluid side outlet, and a vent opening to atmosphere substantially coaxial with the said inlet opening, a valve chamber within the said casing positioned between the said inlet and the said vent, the said chamber having a substantially transverse passageway to the said side outlet, a tiltable plate type valve closure member annularly seated at the lower portion of the said chamber and fitting closely therewithin for its entire maximum periphery except for that peripheral portion which is interrupted so as to form the said passageway, the said closure member having respective annular seat bearing contacts upon its upper and lower sides, the lift of the said valve closure member and the said fit within the said chamber being so limited as to permit of the tilting of the latter whereby contact with an annular portion of the said seats not in the same plane may be effected.

EDWARD A. FREDRICKSON.